July 3, 1956
L. H. MORIN
2,752,636
METHOD AND APPARATUS FOR PRODUCING
CONTINUOUSLY CAST MESH PRODUCTS
Filed Sept. 10 1953
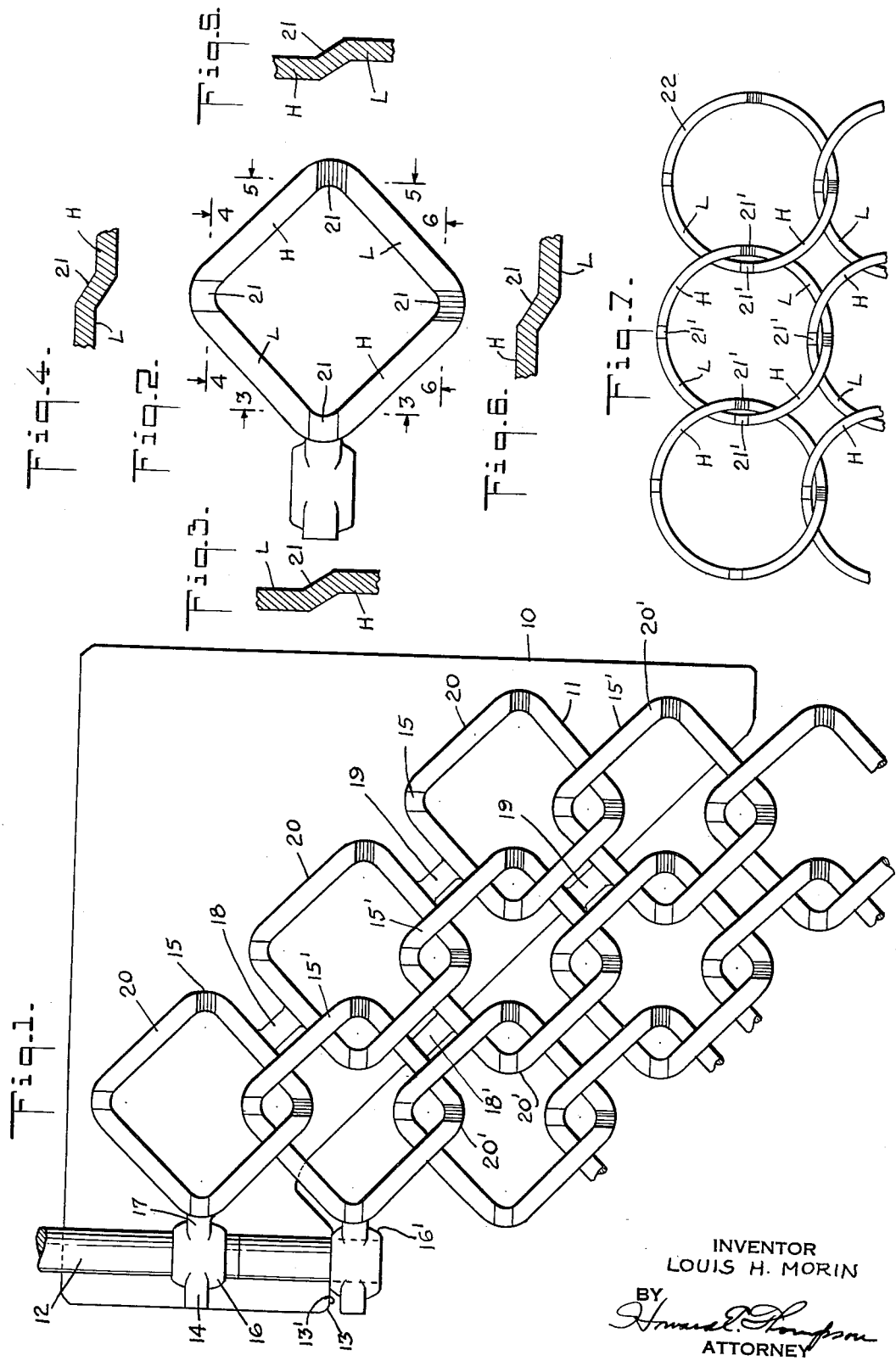
INVENTOR
LOUIS H. MORIN
BY
*Howard E. Thompson*
ATTORNEY

United States Patent Office

2,752,636
Patented July 3, 1956

2,752,636

METHOD AND APPARATUS FOR PRODUCING CONTINUOUSLY CAST MESH PRODUCTS

Louis H. Morin, Bronx, N. Y.

Application September 10, 1953, Serial No. 379,405

3 Claims. (Cl. 18—42)

This invention relates to the production of mesh products, that is to say, products comprising a plurality of ring-like members which are cast one within the other in a continuous fashion forming a mesh product of predetermined length and width. More particularly, the invention deals with a method, wherein one series of links of a mesh product are cast within an adjacent series of link products and the assemblage is then trimmed to remove gates or runners in forming the resulting freely flexible mesh body.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic view taken in alinement with the face of a die and illustrating the method of forming and uniting links of the product to be formed.

Fig. 2 is an enlarged detail view of one of the links of a product.

Figs. 3, 4, 5 and 6 are broken sectional views on the lines 3—3, 4—4, 5—5 and 6—6 of Fig. 2; and Fig. 7 is a detail view illustrating another form of product produced in accordance with the method disclosed.

In Fig. 1 of the drawing, I have diagrammatically shown at 10 a face view of one die of a pair of dies used in forming a mesh body or product 11. At 12 is shown a core pin supported in an extension 13 of the die, the extension having a sprue passage 14, into and through which material is pressure injected to enter cavities 15 of the die 10.

The extension 13 is shaped to form a gripper boss 16 around the pin 12, as well as a short runner or sprue 17 which leads into the first cavity of the die. Joining the first and second cavity is another sprue or runner 18 and at 19 is shown another sprue or runner extending between the second and third cavities. At this time, it is well to point out that, while, in the accompanying drawing I have shown simply three cavities 15, this is solely by way of illustration, as the number of these cavities will depend entirely upon the number of transverse links which are to be employed in the resulting mesh product or body and also governed by the size of the links which are employed.

In the pressure injection of heated casting or moulding material into the cavities 15, one series of links 20 are formed, the series being three in the present illustration.

After formation of the series of links 20, the dies 10 are opened and the core pin 12 is actuated to move downwardly to bring the boss 16 formed integrally with the links 20 into a position, as noted at 16', in alinement with a downward extension 13' on the die, after which the dies are partially closed and the core pin 12 is moved upwardly to its original casting position, as shown in full lines in Fig. 1, whereupon the dies are fully closed and the next injection of material into the die cavities 15 takes place.

The dies 10 have other cavities 15' for receiving the previously cast series of links 20 and this previously cast series of links will be identified by the reference characters 20' in Fig. 1 of the drawing. It will, thus, be apparent that, in casting the next series of links at the position 20 shown in Fig. 1, this will form said second series within the first series at the position 20', particularly by virtue of the construction of each of the links in the respective series as will now be more specifically defined.

Considering Figs. 2 to 6, here one of the links 20 is shown and, as each link of a series is identical with its adjacent link, the brief description of one will be applicable to all.

In Fig. 2 of the drawing, it will be apparent that the two opposed sides identfied by the reference character H are high sides of the link; whereas the other opposed sides, designated by the reference character L, are the low sides of the link. These high and low sides join each other by corner offsets, as noted at 21 in Figs. 3 to 6, inclusive, and, in each of these figures, the reference characters H and L have been applied to the link or that part of the link which is shown so that the structure of the link will be clear.

To clearly illustrate the engagement of the separate series of links one with the other, the reference characters H and L have been applied to all of the links 20 and to part of the links in the position 20'.

It will be noted from a consideration of Fig. 1 of the drawing that, by virtue of the angular arrangement of the series of links 20 in the dies, or the cavities 15 for forming said links, in the downward movement of the core pin 12, the first link in each series is maintained in the same vertical alinement, but shifts to a position to engage and be intercoupled with the first and second links of the next succesive series of links to be formed in the manner clearly illustrated.

It will also be apparent that the dies will be fashioned to receive the sprues or runners at the positions 18', 19'. When the series of links get beyond the limits of the dies 10, these sprues or runners will be severed from the links in a trimming operation, thus producing the resulting flexible continuously cast or moulded mesh body. It will be apparent that products of the kind under consideration can be produced as die castings or as injection moulded products, depending entirely upon the type and kind of material employed in the forming operation.

In Fig. 7 of the drawing, I have shown a slight modification, wherein links 22 of circular formation are employed, rather than the general rectangular formation shown in the other figures. In this showing, it will be necessary only to identify the high and low opposed sides, in which the reference characters H and L are again utilized to illustrate the engagement of the links one with respect to the other and at 21' is indicated the offsets in the links which join the high and low sides of each link. These offsets are similar to the offsets 21, clearly shown in Figs. 3 to 6, inclusive. In other words, it will be apparent that any shape or form of link body can be employed in the resulting product and the surfaces of the links can be characterized in any desired manner, this being controlled by the contour of the die or engravings which are employed.

In my prior application, Serial Number 294,185; filed June 18, 1952, of which the present application is a continuation-in-part, I have disclosed a method of forming one or more chains wherein adjacent links of a chain are coupled one directly with the other.

According to the method herein disclosed, it will be apparent that the series of cast members or links formed in the injection charge of material into the die cavities are disposed at an angle less than 90° to the core pin or path of shifting movement of the series of castings in the die. This results in arrangement of the members or links one within the other and in shifting the high portions of the members or links to positions engaging low portions of the adjacent series of members or links formed in accordance with the process. Descriptively speaking, this may be said to comprise moulding or casting the series of members or links in a plane disposed at an acute angle with respect to the path of movement of the core pin used to shift the series of castings into different positions in the dies.

The term links is descriptively used only in defining what might be termed a link-like body. This link-like body may also be generally termed a ring-like or hollow member. In all cases, an opening of some type or other must be formed in the member for reception of a part, or parts of other members, which results in producing the mesh-like product.

Having fully described my invention, what I claim as new and desire to secure by Letters Patent is:

1. The method of producing a mesh product in an automatic high speed die casting machine, comprising a series of loosely interengaging members arranged transversely and longitudinally of the product, which comprises employing a coreless die having an angularly arranged series of intercommunicating cavities, characterized to form members of said product, pressure injecting heated material into the cavities in the absence of a separate core member to form a series of members spaced and integrally joined by runners, forming said series of members on a core pin, then separating the dies and moving said series of formed members into a predetermined spaced position with respect to the first die cavities and in registering position with other cavities of the dies, then partially closing the dies and stripping the core pin from said first series of formed members, and then closing the dies and forming another series of members in the first cavities again in the absence of a separate core member and similar to the first series of members and with at least two members of said second series each intercoupled with two adjacent members of said first series.

2. The method of producing a mesh product in an automatic high speed die casting machine, comprising a series of loosely interengaging members arranged a transversely and longitudinally of the product, which comprises employing a coreless die having an angularly arranged series of intercommunicating cavities, characterized to form members of said product, pressure injecting heated material into the cavities in the absence of a separate core member to form a series of members spaced and integrally joined by runners, forming said series of members on a core pin, then separating the dies and moving said series of formed members into a predetermined spaced position with respect to the first die cavities and in registering position with other cavities of the dies, then partially closing the dies and stripping the core pin from said first series of formed members, then closing the dies and forming another series of members in the first cavities again in the absence of a separate core member and similar to the first series of members and with at least two members of said second series each intercoupled with two adjacent members of said first series, and forming each member of each series with opposed high and opposed low portions in the same relationship in each member of the series, whereby, in the angular relationship of the formed series of members, the shifting of said series will bring low portions of members of one series in alinement with high portions of members of the adjacent series.

3. A die structure for producing a mesh product, consisting of transversely and longitudinally arranged loosely intercoupled link members, the dies for forming said members comprising a passage in which a pin is adapted to be arranged and operate, the dies at one side of the pin having a series of similar cavities arranged at an acute angle to the axis of said pin, the dies having runners communicating with adjacent passages, the dies also having a cavity encircling the pin and including a runner portion extending to one of said cavities, whereby, in pressure injecting material into the die cavities under pressure, a plurality of similar link members are formed in said cavities, integrally joined by runners, said dies having other series of cavities in the absence of a separate core member arranged in the same angular relationship to said first series but spaced therefrom, said second series of cavities being adapted to receive a cast series of link members when moved into a different position in the dies by operation of said pin, means to strip the pin from the series of ring members when moved into said shifted position, when the dies are partially closed by actuation of said pin, preparatory to moving the pin into position to receive the next successive series of ring members formed in said first named cavities, the cavities of the dies being so fashioned as to form, on each of the ring members, opposed high and opposed low sections, and the arrangement of the sections of link members one with respect to the other being such as to dispose high sections of one series of link members in registering position with low series of link members of an adjacent series in forming the resulting mesh product all in the absence of a separate core member.

References Cited in the file of this patent

UNITED STATES PATENTS

| | | |
|---|---|---|
| 2,051,653 | Rich | Aug. 18, 1936 |
| 2,388,986 | Morin | Nov. 13, 1945 |
| 2,424,047 | Morin | July 15, 1947 |
| 2,460,524 | Morin | Feb. 1, 1949 |
| 2,498,031 | Deiss | Feb. 21, 1950 |
| 2,577,350 | Morin | Dec. 4, 1951 |